No. 689,935.  
C. E. WEHRENBERG.  
HARROW.  
(Application filed Apr. 20, 1901.)  
Patented Dec. 31, 1901.
(No Model.)
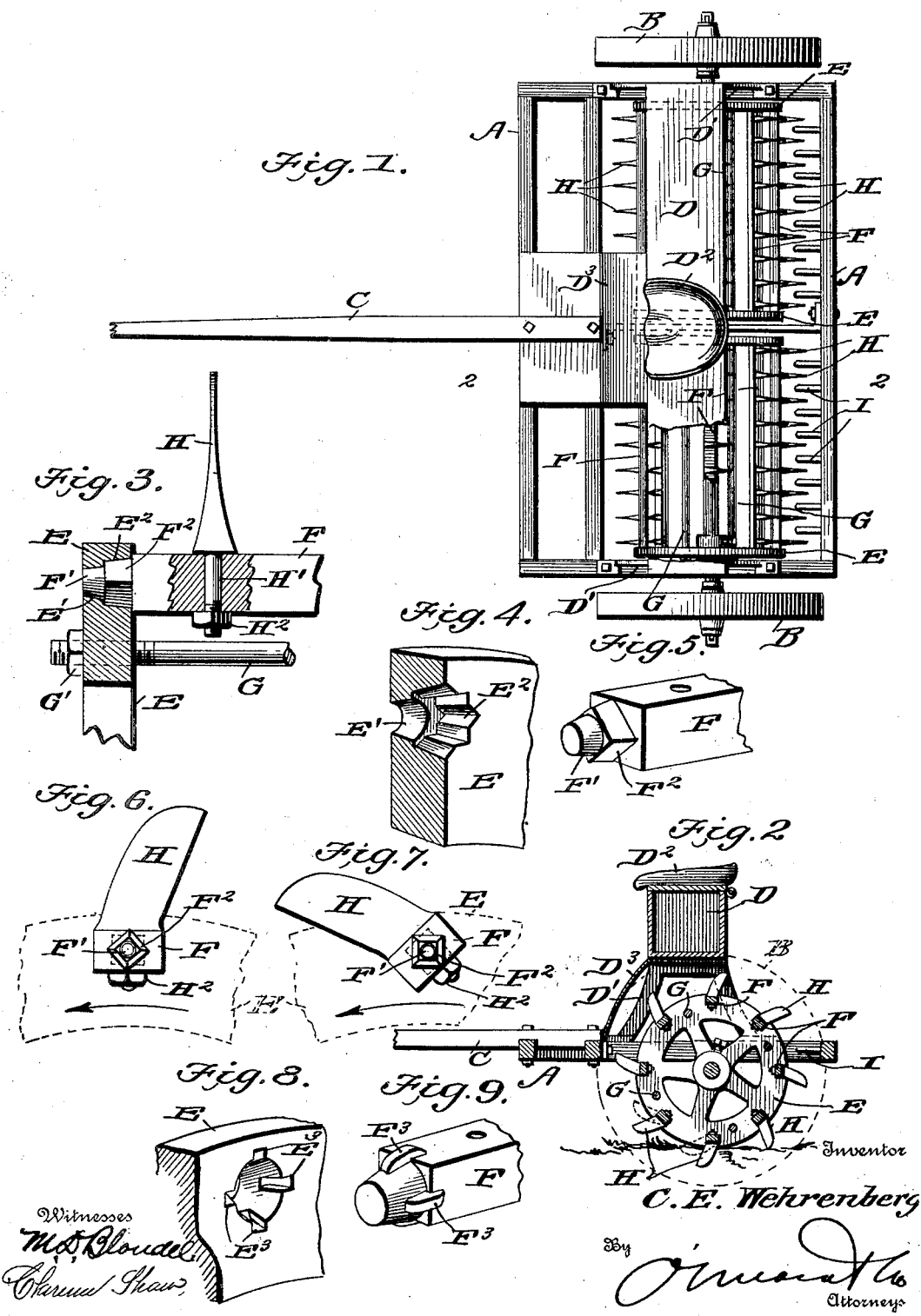

UNITED STATES PATENT OFFICE.

CHARLES E. WEHRENBERG, OF MOUND CITY, ILLINOIS.

HARROW.

SPECIFICATION forming part of Letters Patent No. 689,935, dated December 31, 1901.

Application filed April 20, 1901. Serial No. 56,742. (No model.)

*To all whom it may concern:*

Be it known that I, CHARLES E. WEHRENBERG, a citizen of the United States, residing at Mound City, in the county of Pulaski and State of Illinois, have invented a new and useful Harrow, of which the following is a specification.

This invention relates generally to harrows, and more particularly to a convertible harrow or one which can be transformed from a harrow proper or clod-cutter to a pulverizer and packer.

The object of the invention is to provide a simple construction of rotary harrow capable of being quickly and easily converted for the purposes hereinbefore mentioned; and with these objects in view the invention consists, essentially, in arranging a series of toothed bars between a pair of rotary disks, said toothed bars being securely clamped between said disks, but capable of a certain rotary adjustment, whereby the angle or inclination of the tooth may be adjusted for the purpose of converting the harrow from a clod-cutter to a pulverizer, and vice versa.

The invention consists also in certain details of construction and novelties of combination, all of which will be fully described hereinafter, and pointed out in the claims.

In the drawings forming part of this specification, Figure 1 is a top plan view, parts being broken away to more clearly show the construction of the device. Fig. 2 is a vertical sectional view on the line 2 2 of Fig. 1. Fig. 3 is a detail sectional view showing a portion of the toothed bar, one of the disks, and the tie-rods for clamping the disk and bar together. Fig. 4 is a detail perspective view, partly in section and partly in perspective, illustrating the shape of the socket in the disk. Fig. 5 is a detail perspective view illustrating the construction of the end of the toothed bar. Fig. 6 is a view showing the position of the harrow-teeth arranged for cutting the earth or clogs. Fig. 7 shows the position of the teeth when arranged for pulverizing and packing. Fig. 8 shows a slightly-modified form of socket, and Fig. 9 a correspondingly-modified construction of the toothed bar.

In carrying out my invention I employ a main frame A, mounted upon the grounds-wheels B and provided with the usual draft-tongue C. A box D is mounted upon brackets D', arranged upon the main frame, said box being adapted to receive weights of any kind in order to give the harrow a sufficient weight to properly accomplish its work. A seat $D^2$ is arranged upon the top of the box D, and a suitable guard-plate $D^3$ depends from the front of the box to the main frame in order to protect the driver from contact with the harrow-teeth.

The rotary harrow is preferably made in two sections, each section comprising circular disks E, rigidly mounted upon the axle, and the toothed bars F, arranged between said disks, the bars being held in place by means of the tie-rods G, which pass through the disks and carry the nuts G' upon their outer ends, securely holding the toothed bars between the disks. Each toothed bar F has a reduced circular end F', which is intended to fit into the circular portion E' of the socket formed in the disk, and between the reduced circular end F' and the toothed bar F, I prefer to construct a shoulder $F^2$, square in cross-section, adapted to fit into the square or angular portion $E^2$ of the socket formed in the disk, it being understood that each socket comprises a circular portion and an angular portion, said angular portion being essentially in the shape of two intersecting or overlapping squares, thereby producing a socket of eight angulars or recesses. By means of a socket constructed in this manner and having the end of the toothed bar made square in cross-section it will be readily understood that by loosening the tie-rods G the toothed bar can be given an eighth or a one-fourth turn, so that the position of the harrow-tooth H can be changed from one position to another, as most clearly shown in Figs. 6 and 7. Each harrow-tooth H has a threaded shank H', by means of which and a nut $H^2$ the harrow-teeth are securely fastened in the toothed bars, it being understood that any desired number of teeth may be employed, and these teeth may be of any shape desired; but in practice I prefer to construct them in the shape illustrated in Figs. 2, 6, and 7.

In Figs. 8 and 9 I have shown a slight modification of the end of the toothed bar, and also the socket for receiving the same, the socket proper being circular in form and having four recesses E³, which are intended to receive ribs F³, formed upon the end of the toothed bar. The operation of these modified forms is identical with forms illustrated in Figs. 3, 4, and 5. A series of cleaning-teeth I are attached to the rear member of the main frame and extend inwardly, said teeth being arranged alternately with the harrow-teeth and adapted to scrape away any dirt which may adhere to the teeth.

The operation of my harrow is substantially the same as that of rotary harrows now in use; but it will be readily understood that by having the toothed bars constructed and arranged as heretofore shown and described I am enabled to convert my harrow from a clod cutter and pulverizer to a packer without adding to or taking from the machine.

The elevating or ground wheels can be dispensed with, if desired, and the teeth can be integral with the toothed bars or they can be fastened in any other suitable manner.

Having thus fully described my invention, what I claim as new, and desire to secure by Letters Patent, is—

1. In a harrow of the kind described, the combination with the disks having the two-part sockets, one part of the socket being circular in cross-section and the other part angular in cross-section, of the toothed bars having their ends shaped to fit the sockets in the disks, and the tie-rods for connecting the disks and holding the toothed bars in their proper positions, substantially as shown and described.

2. In a harrow of the kind described, the combination with the circular disks having the two-part sockets, one part being circular in cross-section and the other part angular, of the toothed bars having reduced end portions, the extreme end portion being circular in cross-section and the adjacent portion rectangular in cross-section, whereby the position of the toothed bar may be adjusted as desired, and the tie-rods for clamping the disks and toothed bars together, substantially as shown and described.

CHAS. E. WEHRENBERG.

Witnesses:
A. J. STOUT,
T. HARDIN.